(12) United States Patent  (10) Patent No.: US 8,717,670 B2
Starodoumov et al.  (45) Date of Patent: May 6, 2014

(54) FIBER-MOPA APPARATUS FOR DELIVERING PULSES ON DEMAND

(75) Inventors: Andrei Starodoumov, Cupertino, CA (US); Ronald Lambert, San Jose, CA (US); Michael Snadden, Sunnyvale, CA (US); Andreas Diening, Palo Alto, CA (US)

(73) Assignee: Coherent, Inc., Santa Clara, CA (US)

( * ) Notice: Subject to any disclaimer, the term of this patent is extended or adjusted under 35 U.S.C. 154(b) by 255 days.

(21) Appl. No.: 13/163,102

(22) Filed: Jun. 17, 2011

(65) Prior Publication Data

US 2012/0320450 A1  Dec. 20, 2012

(51) Int. Cl.
*H04B 10/17* (2011.01)
*H01S 3/10* (2006.01)

(52) U.S. Cl.
USPC ............................. 359/341.1; 372/25; 372/26

(58) Field of Classification Search
USPC ................................... 372/25, 26; 359/341.1
See application file for complete search history.

(56) References Cited

U.S. PATENT DOCUMENTS

| 6,414,980 | B1 | 7/2002 | Wang et al. |
| 6,683,893 | B2 | 1/2004 | Wang |
| 2008/0112041 | A1* | 5/2008 | Clubley et al. ................ 359/305 |
| 2009/0046746 | A1 | 2/2009 | Munroe et al. |
| 2009/0185588 | A1 | 7/2009 | Munroe |
| 2011/0019705 | A1 | 1/2011 | Adams et al. |
| 2011/0085580 | A1 | 4/2011 | Allie et al. |

FOREIGN PATENT DOCUMENTS

| WO | 2010/063034 A2 | 6/2010 |
| WO | WO 2010063034 A2 * | 6/2010 |
| WO | 2010/063034 A3 | 8/2010 |

OTHER PUBLICATIONS

International Search Report and Written Opinion for PCT Patent Application No. PCT/US2012/041953, mailed on Mar. 1, 2013, 13 pages.
Fontanella, Joel, Unpublished U.S. Appl. No. 12/367,174, filed Feb. 6, 2009, titled as "Gas Laser Discharge Pre-Ionization Using a Simmer-Discharge", 19 pages.

* cited by examiner

*Primary Examiner* — Eric Bolda
(74) *Attorney, Agent, or Firm* — Morrison & Foerster LLP

(57) ABSTRACT

A fiber-MOPA includes a seed-pulse source followed by fiber amplifier stages. The seed pulse source delivers signal pulses for performing a laser operation and delivers radiation between the seed pulses to maintain the collective average of the seed pulse power and intermediate radiation power constant. Keeping this average power constant keeps the instantaneous available gain of the fiber amplifier stages constant. This provides that the seed pulse delivery can be changed from one regime to a next without a period of instability between the regimes.

9 Claims, 5 Drawing Sheets

*FIG. 5A*
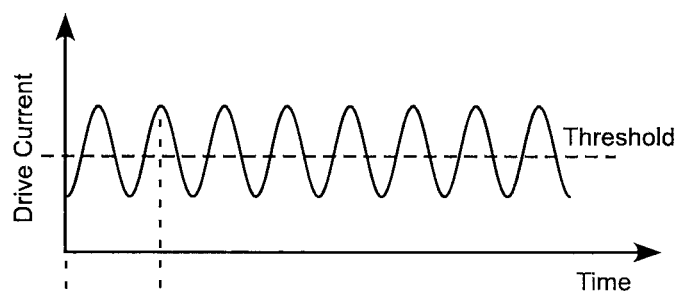
*FIG. 5B*
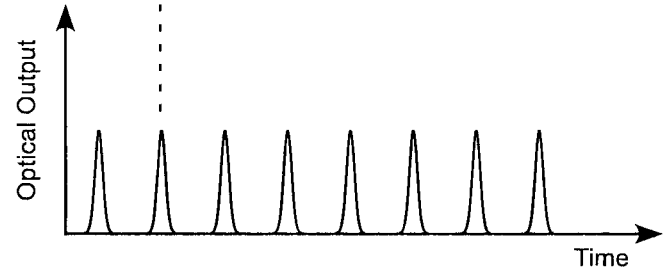
*FIG. 5*
(Prior Art)

FIBER-MOPA APPARATUS FOR DELIVERING PULSES ON DEMAND

TECHNICAL FIELD OF THE INVENTION

The present invention relates in general to pulsed fiber-MOPA (master oscillator power amplifier) apparatus. The invention relates in particular to fiber MOPAs for delivering pulses, on demand, and in arbitrary sequence.

DISCUSSION OF BACKGROUND ART

Pulsed lasers are used extensively for material processing applications such as machining, drilling, and marking. In many of these applications identical beam propagation properties and the same laser pulse energy from pulse to pulse are a requirement. A pulse repetition rate and a pulse duration that are optimum for an operation on any one material will usually not be optimum for another operation or another material. Accordingly, an "ideal" pulsed laser would have independently variable pulse-repetition frequency (PRF) and pulse-duration to allow an optimum combination to be selected for most applications on most materials. Such an ideal laser could be termed as a "pulse-on-demand" laser for delivering a single pulse or a burst of pulses with an arbitrarily interval between pulses. This interval can range from a few microseconds (μs) to a second or greater. Consistent beam propagation properties are required so that the laser pulses can be consistently focused into a desired spot size at a predetermined location. Preferably PRF should be variable without varying the pulse duration.

One type of laser apparatus in which the PRF can be varied without a variation in pulse duration is a fiber-MOPA. In such apparatus seed pulses are generated by a modulated single-mode semiconductor diode laser or a continuous-wave (CW) laser followed by a modulator such as an electro-optic (E-O) modulator or an acousto-optic (A-O) modulator. Such a fiber-MOPA can be operated at a PRF from less than 100 kilohertz (kHz) up to about 5 megahertz (MHz) or greater, with a pulse duration selected between about 0.01 nanosecond (ns) and 100 ns or greater. The seed pulses are amplified by a chain of fiber-amplifier stages. Early stages are usually designated as pre-amplifier stages and subsequent stages are designated as power amplifier stages. Fiber-MOPAs for the above mentioned applications usually emit pulses having a wavelength between about 1000 and 1100 nm. The wavelength of the pulses can be shortened by harmonic-conversion or sum-frequency mixing in one or more optically nonlinear crystals.

Typically most of the amplifiers are energized by CW pump radiation. Because of this, there are certain factors which affect pulse stability at the output of a fiber-MOPA and the output characteristics of the fiber-MOPA can change significantly when a pulse operating regime is changed.

One factor relates to transient-gain oscillations in the fiber amplifiers when average power of the signal or a pulse energy changes. In this case, the fiber-MOPA provides variation in gain, typically in the first few milliseconds after switching from one regime to another. In Yb-doped fiber amplifiers this can be within about 1 to 3 milliseconds (ms) after switching, depending on the number of fiber amplifier stages in the amplifier chain. The more fiber amplifiers in the chain the longer is the transient gain oscillation time.

Typically, those amplifiers operate in a saturated regime when incoming optical pulses change the inversion population and gain of the amplifier. Most of the pre-amplifier stages operate in a mode wherein gain is saturated by the average power of a signal train. By way of example, saturation power in Yb-doped fiber with 6-micrometer (μm) core-diameter is between about 5 and 20 milliwatts (mW), depending on a signal wavelength. Typical average power from a diode-laser seed source with 10-ns pulses at a PRF of 200 kHz is about 2 mW. If there is a sufficiently long time interval between pulses or bursts of pulses (longer than 1% of the excited-state lifetime, which is about 700 microseconds (μs) in a typical Yb-doped silica fiber), then inversion population starts to change between pulses due to competition between amplified spontaneous emission and the CW pumping, and may cause a variation in the gain (and accordingly power) from pulse-to-pulse.

FIG. 1 is a reproduction of an oscilloscope trace schematically illustrating the form of the envelope of an original stable pulse-train having 5-ns pulses at a PRF of 200 kHz and the envelope of a new pulse-train having 1-ns pulses at a PRF of 1 MHz, around the time of switching from the original train to the new train, in a prior-art fiber MOPA. The time base is 200 microseconds-per-division on which scale individual pulses are not discernable. The severe fluctuation of peak power after switching from one train to the next is clearly evident. It can be seen that about 800 μs is required before the power begins to stabilize, during which time 800 individual pulses have been delivered each having a different peak power and pulse-energy.

In fiber-MOPA apparatus in which harmonic-conversion or sum-frequency mixing (frequency-conversion) is employed to provide shorter wavelength pulses, such changes in power can affect the efficiency of the frequency conversion and the accuracy of beam pointing. The efficiency of frequency conversion in an optically nonlinear crystal depends on phase-synchronism of interacting beams, and depends on the temperature of a nonlinear crystal. Variations of the crystal temperature detune the phase-synchronism from an optimal position and reduce the efficiency of the frequency-conversion process. Accordingly it is important to maintain the nonlinear crystal at a constant temperature. The presence of a small amount of absorption in the crystal and absorption of scattered signal light in the crystal holder leads to changes of the crystal temperature depending on incident average power. Because of this, the above described fluctuations in power from pulse to pulse in the fundamental fiber-MOPA can cause corresponding fluctuations in conversion efficiency and beam pointing in frequency conversion stages. Accordingly, there is need for a mode-of operating a fiber-MOPA that can mitigate, if not altogether eliminate, output pulse instability when a pulse regime is changed.

SUMMARY OF THE INVENTION

The present invention is directed to laser apparatus for delivering temporally spaced laser pulses for performing a laser operation. In one aspect, the apparatus comprises a source of optical pulses and at least one fiber-amplifier for amplifying the optical pulses. The source of optical pulses is operable to provide a selectively variable train of signal pulses for performing the laser operation, and to deliver idler radiation between the signal pulses. The signal pulses and the idler radiation together have a time-averaged power, and the fiber-amplifier has an instantaneous available gain dependent on that time-averaged power. The optical pulse source is operable in a manner such that the time-averaged power of the signal pulses and the idler radiation, and the instantaneous available gain of the fiber-amplifier remain about constant as the train of signal pulses is selectively varied.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

FIG. 5 is a timing diagram schematically illustrating a prior-art scheme for gain-switch driving a diode-laser pulse source to provide idler pulses with a duration of less than 1.0 ns at a PRF of about 100 MHz or greater.

DETAILED DESCRIPTION OF THE INVENTION

Figure 2:
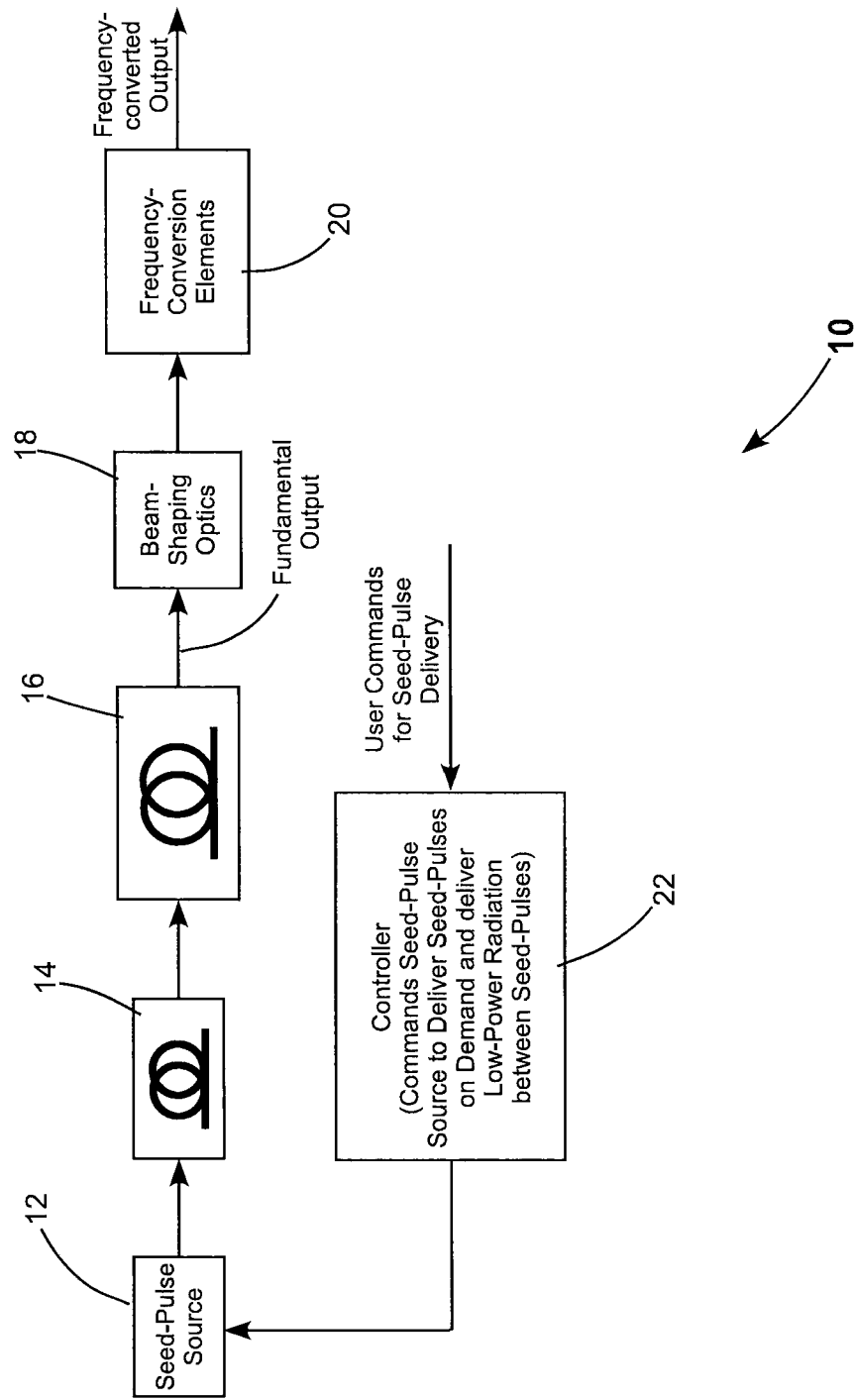
FIG. 2 schematically illustrates a preferred embodiment of fiber-MOPA apparatus in accordance with the present invention, having a seed-pulse source followed by a plurality of fiber-amplifier stages, with a controller arranged to cause the seed-pulse source to deliver signal seed-pulses in response to user request, and low power radiation between requests, in order to maintain a constant average-power output of the fiber-MOPA.

Referring again to the drawings, wherein like components are designated by like reference numerals, FIG. 2 schematically illustrates a preferred embodiment 10 of fiber-MOPA apparatus in accordance with the present invention. Apparatus 10 has a seed-pulse source 12, the output of which is amplified by a fiber-pre-amplifier 14 followed by a fiber power-amplifier 16. In practice the pre-amplifier or the power amplifier may have more than one stage of amplification. The seed pulse source, pre-amplifier, and power amplifier are connected by optical fibers.

Pulsed fundamental output from power amplifier 16 is passed in free space to beam shaping optics 18 and delivered from the beam shaping optics to frequency conversion components 20. The frequency conversion may involve second-harmonic generation using one optically nonlinear crystal or third or higher-harmonic generation using two or more optically nonlinear crystals as is known in the art.

Seed-pulse source 12 may be a single-emitter diode-laser which can be directly modulated by modulating drive current of the laser. Alternatively, a CW laser can be used, with modulation of the CW output of the laser by an electro-optic modulator, preferably a Mach-Zehnder modulator. CW lasers suitable for use in the seed-pulse source include an edge-emitting diode-laser, an external-cavity, surface-emitting, optically pumped semiconductor (OPS) laser, or a solid-state laser.

Seed-pulse source 12 is driven by a power-supply and controller 22. Controller 22 is arranged to receive user commands for delivery of what can be referred to as signal pulses, i.e., pulses that will be amplified to a peak pulse-power or energy sufficiently high for whatever laser operation apparatus 10 is intended. The controller can be configured such that the user commands for a desired signal pulse sequence can be programmed directly into the controller. Alternatively the command sequence can be communicated to the controller from a separate source such as a programmable microprocessor or a PC.

Figure 1:
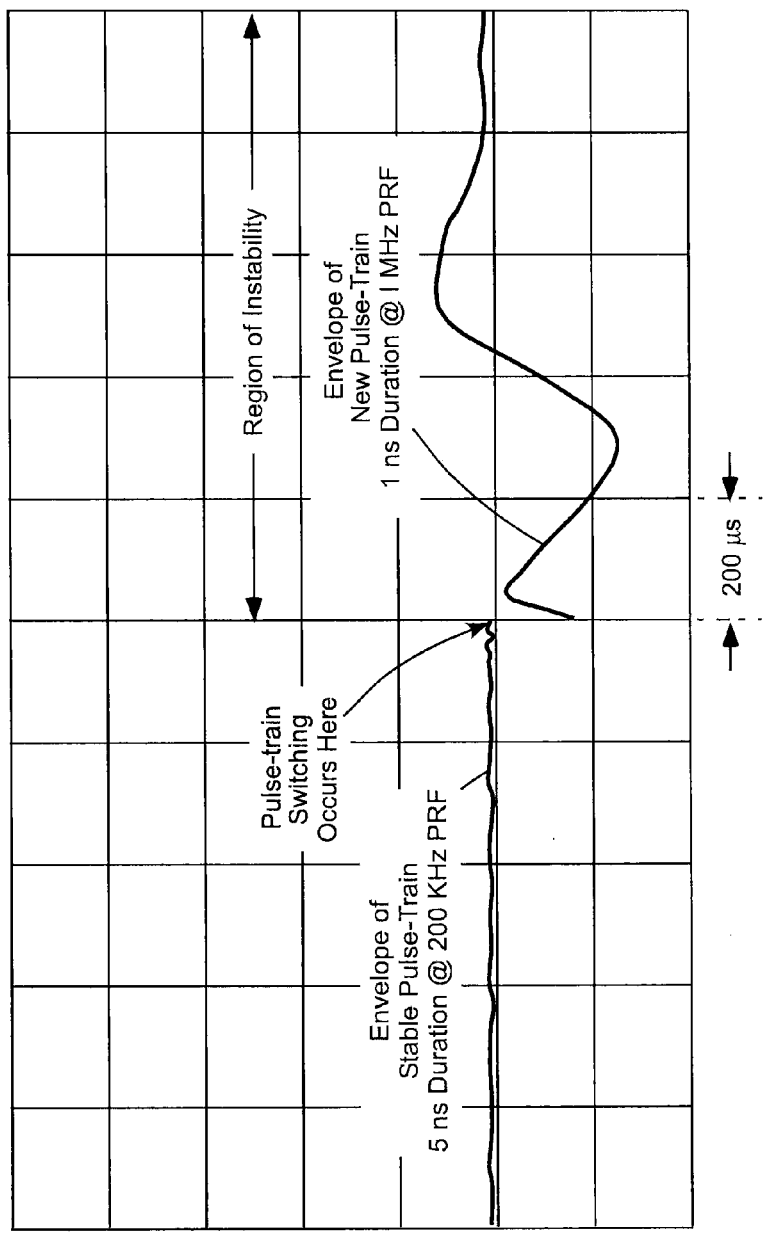
FIG. 1 is a reproduction of an oscilloscope trace schematically illustrating the form of the envelope of an original stable pulse-train having 5-ns pulses at a PRF of 200 kHz and the envelope of a new pulse-train having 1-ns pulses at a PRF of 1 MHz, around the time of switching, in a prior-art fiber MOPA.

The controller is additionally programmed to deliver radiation between the signal pulses, such that the average power output of apparatus 10 remains about constant, whatever the signal pulse regime that is demanded by the user input. The gain of the fiber-amplifier stages, as a result, is clamped at about the same level. This avoids an instability period, such as that depicted in FIG. 1, when there is any change in the regime for signal pulse delivery.

Radiation delivered between the signal pulses has a peak power less than that which would be required for whatever operation apparatus 10 is intended. This radiation can be referred to as idler radiation. The form in which the idler radiation is delivered depends on various factors discussed further herein below. The idler radiation can be CW radiation, modulated CW radiation or pulsed radiation.

Whatever the form, however, it is important in normal operation of the apparatus delivering a sequence of signal pulses interspersed with idler radiation, that there is no period between signal pulse and idler radiation delivery, or between idler radiation pulses that is greater than about the excited-state lifetime of gain-fibers in the amplifier chain. Preferably there is no period less than 10% of the excited state lifetime, and more preferably, no period less than about 1% of the excited state lifetime. This timing is important in the present invention as the intent of the invention is to mitigate instability problems caused by gain fluctuations having a very short time constant as opposed, for example, to effects such as thermal lensing in solid-state gain-media, which have a time constant well in excess the excited-state lifetime of optical gain-fibers.

As noted above, the energy associated with the idler radiation should be low enough that when amplified through the chain of amplifiers, the amplified energy will be below the threshold for performing the intended operation such as machining. In practice, the peak power of the idler radiation should be at least fifty percent of the peak power of the signal pulses and more preferably be twenty five percent less. The energy of the idler pulses should also be at least fifty percent of the energy of the signal pulses and more preferably be twenty five percent less.

Figure 3:
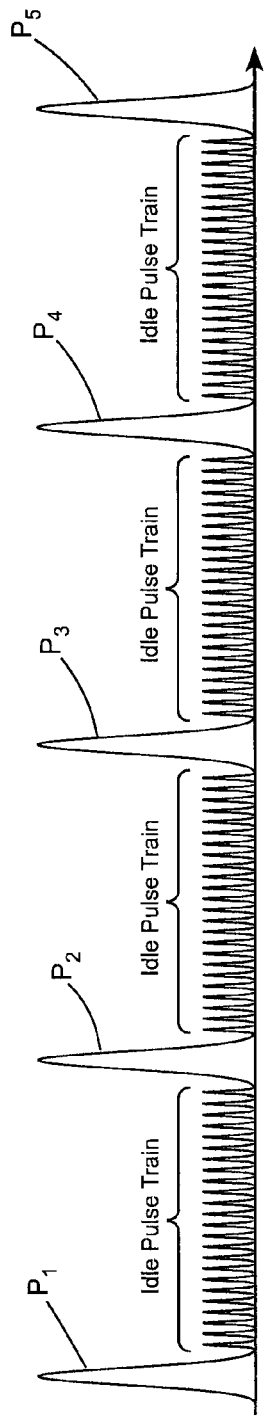
FIG. 3 is a graph schematically illustrating a train of signal pulses having equal temporal separation with trains of equal-amplitude idler pulses delivered between the signal pulses.

FIG. 3 schematically illustrates one exemplary signal-pulse delivery sequence in accordance with the present invention, in which signal pulses $P_1$, $P_2$, $P_3$, $P_4$, and $P_5$ are equally temporally spaced. Between the signal pulses, idler radiation is delivered in the form of pulses having a significantly shorter duration, a significantly lower peak-power, and a significantly higher PRF than those of the signal pulses. This arrangement is useful for signal pulses delivered at a PRF below 200 kHz.

Figure 4:
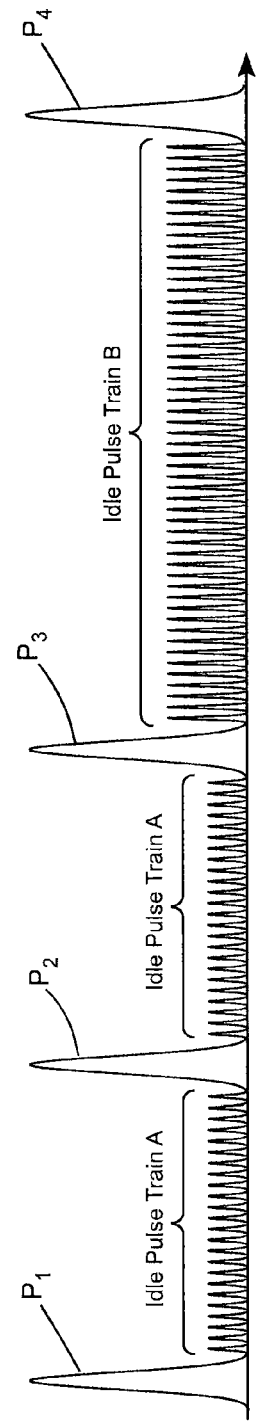
FIG. 4 is a graph schematically illustrating a train of signal pulses with first, second and third ones thereof having the temporal spacing of the signal pulses and the third and a forth ones thereof having twice that temporal spacing with the amplitude of idler pulses between the third and fourth signal pulses being twice that of the idler pulses between the first second and third signal pulses.

FIG. 4 schematically illustrates another exemplary signal-pulse delivery sequence accordance with the present invention in which signal pulses $P_1$, $P_2$, and $P_3$, and are equally temporally spaced and signal $P_4$ is temporally spaced by about twice that spacing. In order to compensate for the longer temporal spacing between pulses $P_3$ and $P_4$, the peak power of the idler pulses therebetween has been increased by about a factor of two, with the PRF and pulse duration remaining about the same.

In either of the above-discussed pulse-train examples, idler pulses can have duration between about 1 ns and 1 microsecond and be delivered at a PRF between about 100 kHz and 10 GHz. Pulses having this duration can be generated conveniently by direct modulation of a diode-laser, i.e., by driving the diode-laser with current pulses. The diode-laser output pulses will correspond to the shape of the current pulses within about 20%. The intent of the idler pulses (idler radiation), as summarized above, is to keep the average power in the fiber amplifiers about constant and thereby keep the available gain about constant. The terminology "about constant", as used in this description and the appended claims, means that the invention can be effective with a variation up to about ±25% in the average power and available gain.

In general terms the duty cycle (pulse duration-to-period ratio) of the idler pulses must be at least 5-times higher than that of the signal pulses to provide at least a 5-times reduction in the peak power. The shorter idle pulses, for example having a duration less than 1 ns, provide a higher threshold for stimulated Brillouin scattering (SBS) and are accordingly more preferable than longer pulses. Idler pulses typically have a broader bandwidth compared to CW light. A typical single-frequency diode-laser has a bandwidth of less than about 30 MHz in CW operation, while in pulsed operation the bandwidth exceeds 100 MHz. By way of example, 1-ns pulse has a bandwidth greater than about 300 MHz.

FIG. 5 is a timing diagram schematically illustrating a prior-art scheme suitable for generating pulses having a duration shorter than about 1.0 ns at a PRF of 100 MHz or higher from a diode-laser. This scheme is often referred to as gain-switching. The scheme would be suitable for generating idler pulses in accordance with the present invention when the above-discussed direct modulation method could not be relied on. In this gain switching scheme, a diode-laser is driven by a very-high-frequency continuously modulated (not pulsed) current fluctuating about the threshold current (for lasing) of the diode-laser (see FIG. 5A in which the current fluctuates sinusoidally). The output of the diode-laser (see FIG. 5B) will be pulses having a pulse-duration (FWHM) less than about one-fifth of the half-cycle time of the driving current.

Figure 6:
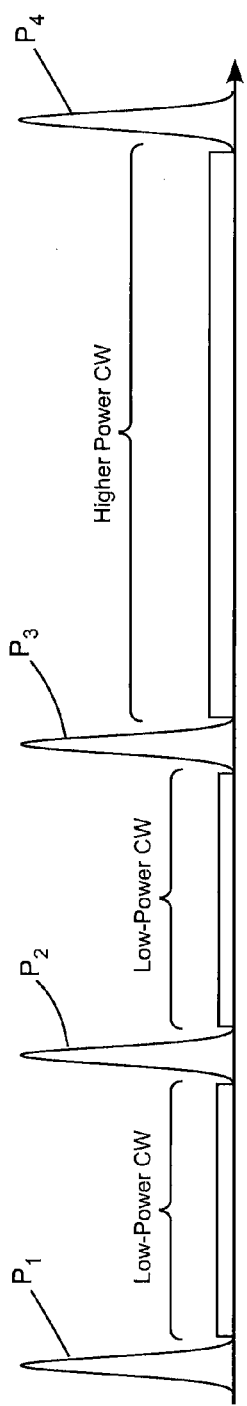
FIG. 6 is a graph schematically illustrating a train of signal pulses similar to the pulse train of FIG. 4, but with low-power constant amplitude CW radiation delivered between the signal pulses.

Idler radiation between signal pulses can be delivered as CW radiation instead of pulsed radiation. By way of example, FIG. 6 is a graph schematically illustrating a train of signal pulses, similar to the pulse train of FIG. 4 with an exception that low-power, constant-amplitude CW radiation is delivered between the signal pulses. It can be seen that the CW amplitude is increased between pulses $P_3$ and $P_4$ to compensate for the longer spacing. It should be noted that the CW amplitude would be at least about 5 times less than the peak-power of idler pulses based on the above discussed general guidelines for idler radiation. However, a potential problem with providing CW radiation between pulses is that a single frequency diode-laser, preferred in seed-pulse source 12, has a low threshold for SBS, as discussed above. SBS can significantly reduce useful gain in the fiber-amplifiers of the inventive fiber-MOPA.

Figure 7:
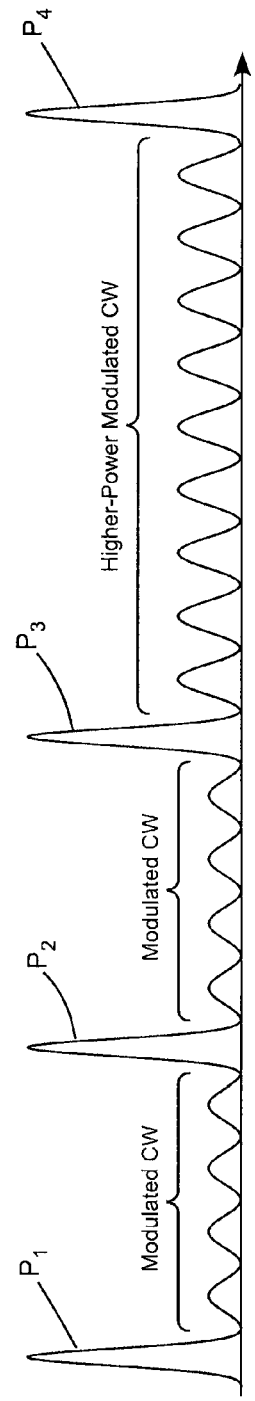
FIG. 7 is a graph schematically illustrating a train of signal pulses having similar to the pulse train of FIG. 6, but wherein the low power CW radiation is sinusoidally modulated.

One means of reducing the potential SBS problem is to modulate the CW radiation, for example with a sinusoidal modulation. This is depicted in FIG. 7, which is a graph schematically illustrating a train of signal pulses similar to the pulse train of FIG. 6, but wherein the low-power CW radiation is sinusoidally modulated to effectively create idler pulses. This modulation, coupled with a low peak amplitude of the modulation can effectively reduce SBS with a modulation cycle as low as about 10 ns. An electro-optical phase modulator placed receiving CW radiation can also be used to broaden the spectrum to increase SBS threshold.

In summary, the present invention is described above with reference to a preferred and other embodiments. The invention is not limited, however, to the embodiments described and depicted. Rather the invention is defined by the claims appended hereto.

What is claimed is:

1. A method of generating laser pulses from a laser system having fiber amplifier comprising the steps of:
   supplying a first sequence of seed pulses to the fiber amplifier, said sequence including a series of first signal pulses having a first pulse width and a first repetition frequency, said first sequence further including a plurality of first idler pulses between each first signal pulse in the series, with the peak power of the first idler pulses being less than half the peak power of the first signal pulses; and
   supplying a second sequence of seed pulses to the fiber amplifier, said second sequence including a series of second signal pulses having a second pulse width and a second repetition frequency with one of said second pulse width and said second repetition frequency being different from the first pulse width and the first repetition frequency, said second sequence further including a plurality of second idler pulses between each second signal pulses in the series, with the peak power of the second idler pulses being less than half the peak power of the second signal pulses and wherein the time averaged power of the second sequence of pulses is within twenty five percent of the time averaged power of the first sequence of pulses.

2. A method of generating laser pulses as recited in claim 1 wherein the duty cycle of the idler pulses is at least five times higher than the duty cycle of the associated signal pulses.

3. A method of generating laser pulses as recited in claim 1 wherein the spacing between idler pulses is less than ten percent of the excited state lifetime of the fiber amplifier.

4. A method of generating laser pulses as recited in claim 1 wherein the seed pulses are generated by a drive current modulated diode laser.

5. A method of generating laser pulses as recited in claim 1 wherein the seed pulses are generated by a externally modulated CW laser.

6. A method of generating laser pulses as recited in claim 1 wherein the idler pulses are defined by a sinusoidally modulated continuous wave format.

7. A method of generating laser pulses as recited in claim 1 wherein the first pulse width and the second pulse width are different.

8. A method of generating laser pulses as recited in claim 1 wherein the first repetition rate and the second repetition rate are different.

9. A method of generating laser pulses as recited in claim 8 wherein the first pulse width and the second pulse width are different.

* * * * *